United States Patent Office 3,516,548
Patented June 23, 1970

3,516,548

DIALYSIS MEANS HAVING SPACING DISKS WITH GRATINGS DISPLACED OR TWISTED IN RELATION TO EACH OTHER

Nils Alwall, Bo Lennart Ostergren, and Nils Olov Wilhelm Hagstrom, Lund, Sweden, assignors to AB Gambro, Lund, Sweden, a Swedish company
Filed May 22, 1968, Ser. No. 731,007
Claims priority, application Sweden, May 25, 1967, 7,324/67
Int. Cl. B01d 13/00
U.S. Cl. 210—321 11 Claims

ABSTRACT OF THE DISCLOSURE

Dialysis devices having pairs of semi-permeable membranes for passage of a liquid, such as blood, therebetween and spacing disks on either side of each pair of membranes, for passage of a dialysis liquid thereabout, the disks having gratings facing the membranes, and the gratings having different patterns so that tortuous passages for the dialysis liquid on both sides of the membranes is obtained whereby a meandering, turbulent flow of the dialysis liquid produces an optimum dialysis effect.

The present invention relates to a dialysis means for purifying blood or other liquids in which impurities in the blood are diffused through semipermeable members holding the blood and are discharged into a purifying liquid by which the impurities are carried away. The semi-permeable membranes or diaphragms are disposed in pairs between spacing members or plate-like discs so as to form spaces with the outer sides of the double diaphragms for the purifying liquid. A package of disks and double diaphragms are pierced by apertures for the blood, from which apertures the blood is distributed and passes between the double diaphragms, in addition to which there are means provided for introducing the purifying liquid into and withdrawing it from the space therefor.

Dialysis means of the kind described above are the subject matter of U.S. Pat. 3,411,630 to Alwall, et al., dated Nov. 19, 1968. In the constructions tested previously it has been found, however, that the spacing disks are relatively expensive to manufacture. Therefore according to the present invention less expensive spacing disks are provided which are particularly suitable to be used once only. At the same time certain technical improvements have been achieved, which will appear in the following description.

The dialysis means according to the present invention is characterized in that one or more of the spacing disks comprise gratings which are displaced or twisted in relation to each other.

Preferably, one of two adjacent spacing disks presents a certain kind of grating against one pair of double diaphrams or membranes, while the other one of the disks presents another kind of grating against the opposite side of the same pair of double diaphragms.

These two different kinds of gratings are preferably formed as a continuous network in a plate, which is then used as the spacing disks. These gratings may be either directly connected with each other or may be secured together by a web uniting them.

In all embodiments of the subject matter of the invention the pairs of adjacent diaphragms will be compressed within small, carefully defined surfaces. At the same time carefully defined blood channels are formed between the diaphragms which may extend both in the longitudinal direction of the disk packages and in a transverse direction thereto. It is also possible to have the blood channels run in a zig-zag configuration.

The invention will be described in more detail with reference to the accompanying drawings showing some preferred embodiments of the invention, chosen by way of example.

Figure 5A:
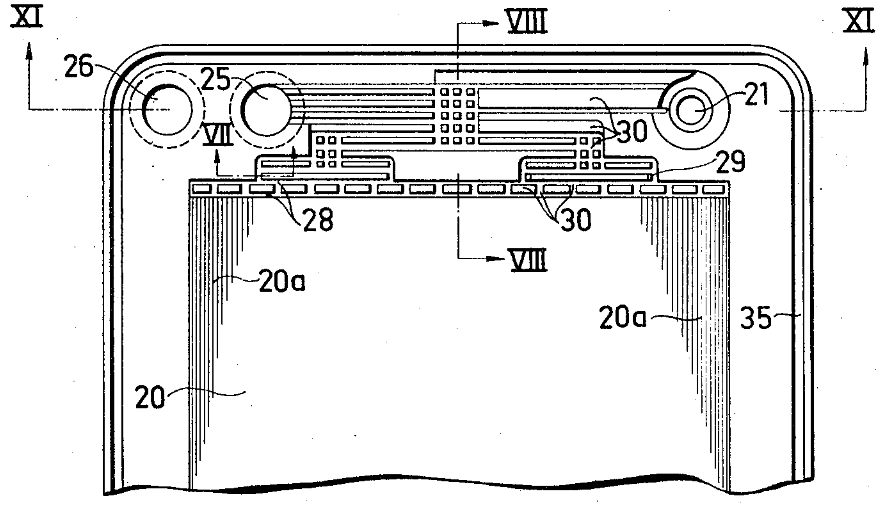
FIG. 5A shows one end of a spacing disk pertaining to another embodiment of the invention.

FG. 8 is a cross section on line VIII—VIII of FIG. 5A.

Figure 9:
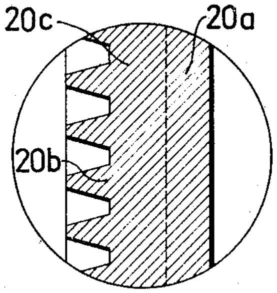
Figure 8:
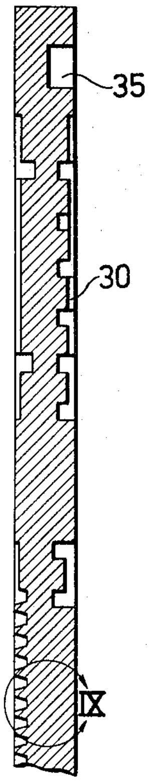

FIG. 9 is an enlargement of the area indicated at IX in FIG. 8.

Figure 5B:
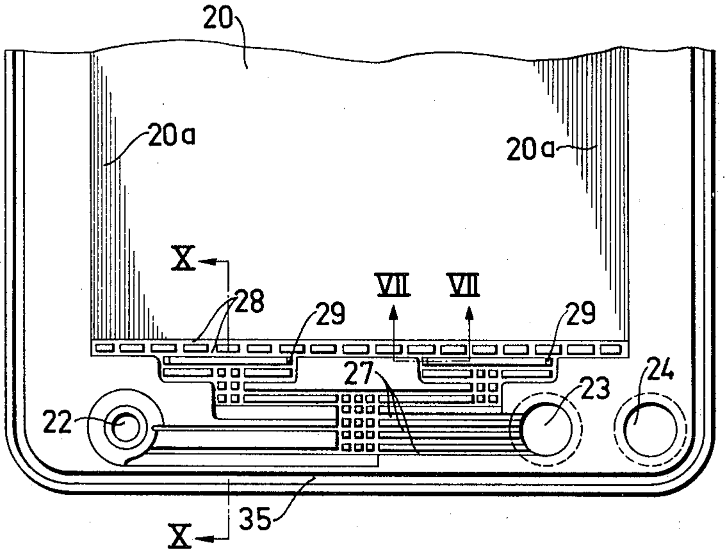
FIG. 5B shows the other end of the disk according to FIG. 5A.
Figure 6A:
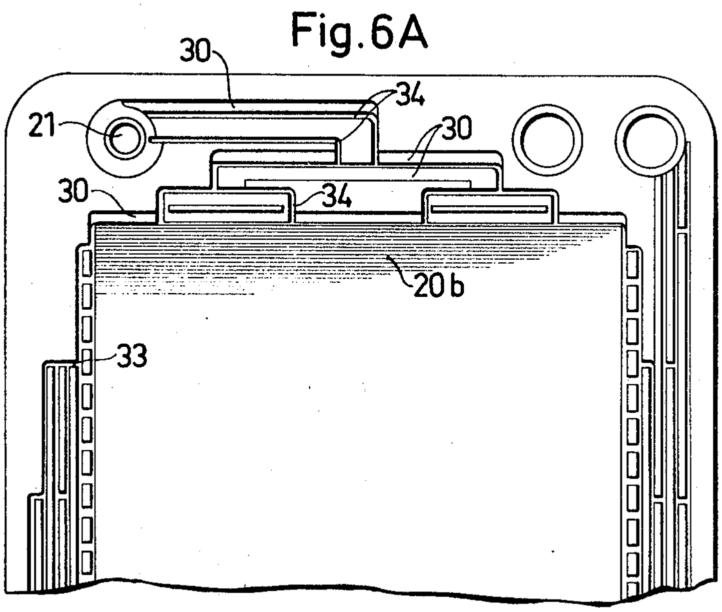
FIG. 6A shows the opposite side of the disk shown in FIG. 5A.
Figure 6B:
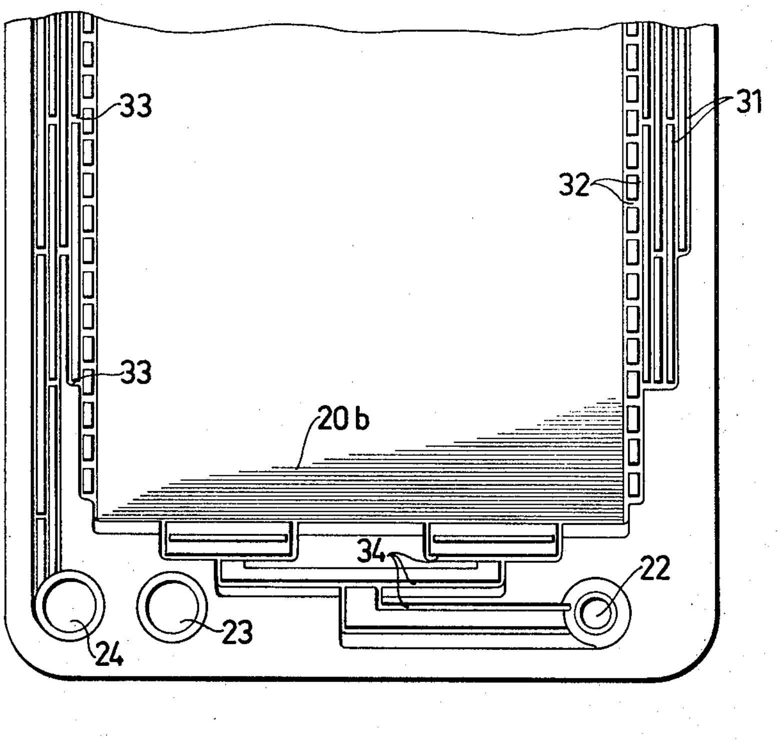
FIG. 6B shows opposite side of the disk shown in FIG. 5B.
Figure 7:
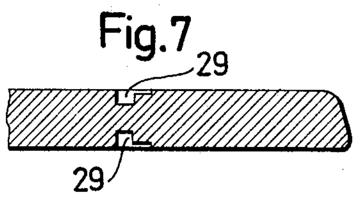
FIG. 7 is a cross section on line VII—VII of FIG. 5B.
Figure 10:
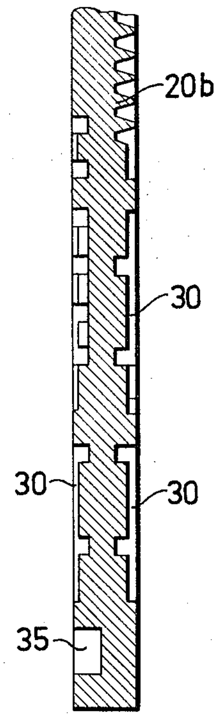

FIG. 10 is a cross section on line X—X of FIG. 5B.

Figure 11A:
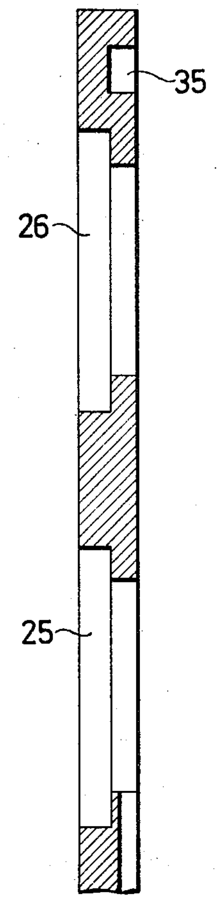
Figure 11B:
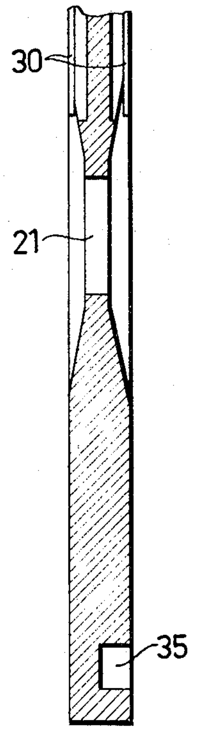

FIGS. 11A and 11B show the respective ends of a cross section on line XI—XI in FIG. 5A.

FIGS. 12A and 12B, 13A and 13B, and 14A and 14B show diagrammatically three different arrangements of the devices shown in FIGS. 1 to 4.

Figure 1:
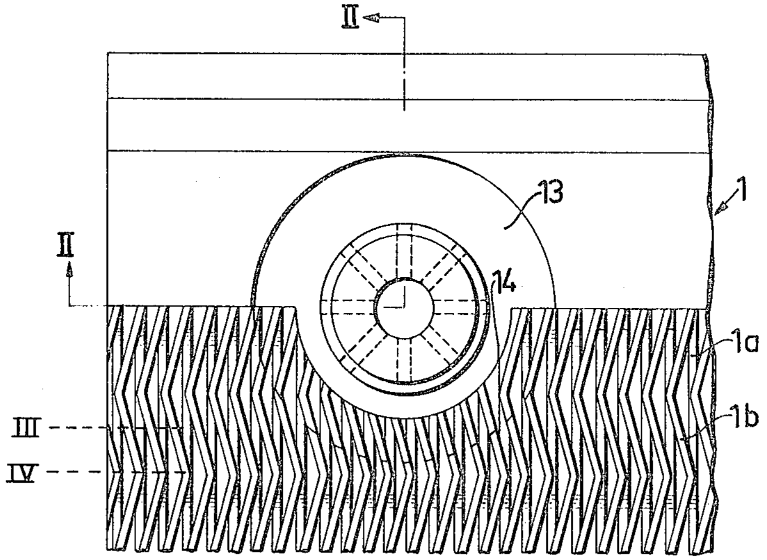
FIG. 1 shows a plan view of a spacing disk in one embodiment of the invention. Also the figure shows a blood distribution button mounted in the hole or aperture in the disk.

The spacing disk shown in FIG. 1 is generally designated 1. The disk consists of two gratings 1*a* and 1*b* displaced in relation to each other. The gating 1*a* is formed by parallel straight ribs. The grating 1*b* is also formed by parallel but zig-zag shaped ribs. The two gratings 1*a* and 1*b* are juxtaposed in the embodiment shown at each angular point of the grating 1*b*. As appears in FIG. 2, each spacing disk 1 is provided with recesses 13 into which blood distribution buttons 2 may be inserted. The blood distribution buttons are mounted between a pair of diaphragms 3 and 4 and communicate with an inlet nipple 5. An aperture 6 extends through the inlet nipple 5 and transversely of the group spacing disks and double diaphragms to form a blood supply channel. Between the nipple 5 and the distribution button 2 as well as between each button 2 there are mounted seals 7. Seals indicated at 8 are also provided between each pair of adjacent spacing disks 1 and between a lowermost bottom plate (not shown) and the lowermost spacing disk in the same way as is shown between the topmost spacing disk and two top plates 9*a*, 9*b*. From the circle 14 (FIG. 1) it appears that the innermost portion of the recess 13 consists of solid composite material, and from the right-hand portion of FIG. 2 further appears that it the outer edge of the plate 1 outside the center of the aperture 6 also consists of solid composite material.

Figure 3:
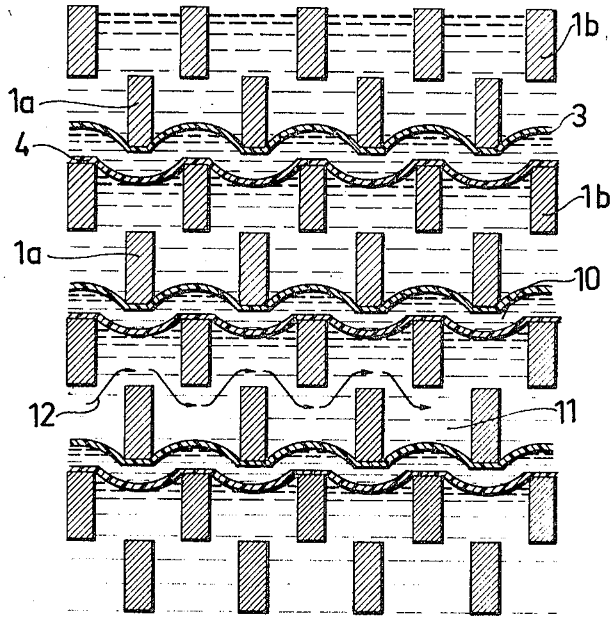
FIGS. 3 and 4 are cross-sectional views on a larger scale, taken on lines III and IV of FIG. 1.
Figure 4:
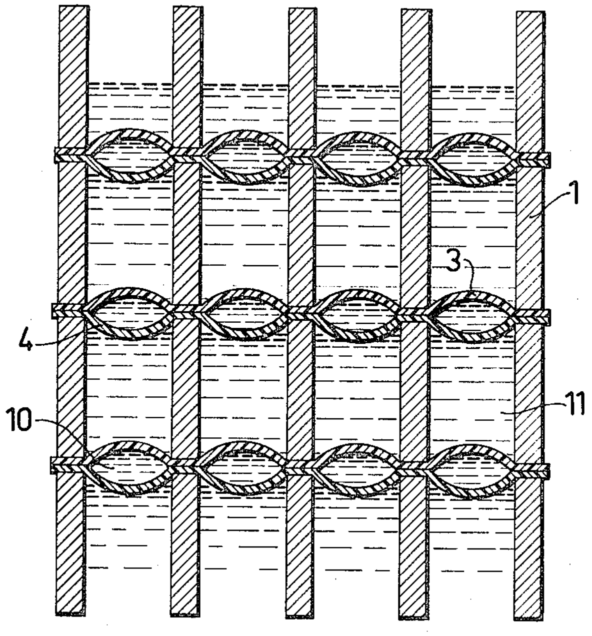

FIGS. 3 and 4 show sections on lines III and IV in FIG. 1. For the sake of clarity only the section itself is shown and not the portions lying behind it, i.e. it is possible that the salt solution and the blood, respectively, block the view of these rear portions. As appears from these figures, there are formed blood channels 10 between the pairs of diaphragms 3 and 4. At the same time, there are formed salt solution channels 11 between each pair of double diaphragms. As appears from the arrows 12 in FIG. 3, it is possible to lead the salt solution transversely of the current in the blood channels and thus obtain a strong meandering motion of the salt solution.

This provides very good flushing of the outsides of the diaphragms, whereby all risks of a laminar flow adjacent thereto is eliminated. Consequently, the highest possible dialysis effect is achieved. Alternatively, it is possible to lead the salt solution downstream or upstream in relation to the blood. The simplest way of supplying the salt solution is to place the assembly of spacing disks and intermediate diaphragms in a closed outer jacket having supply channels for the salt solution at one end and discharge channels therefor at the other end. This will be described below with reference to FIGS. 12A to 14B. Alternatively, the salt solution may also be supplied by means of buttons of the kind described in the above-mentioned U.S. patent.

Figure 2:
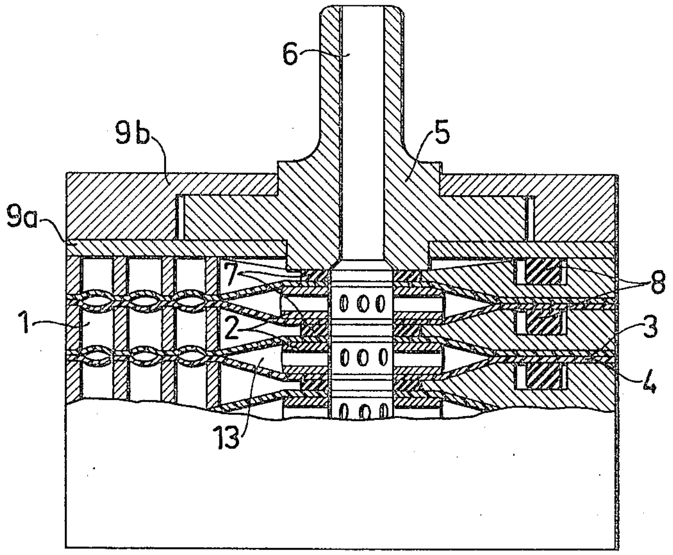
FIG. 2 is a cross-section on line II—II of FIG. 1 and shows the blood distribution button mounted between the diaphragms of a pair of diaphragms.

FIGS. 5A to 11B describe a second preferred embodiment of the invention. In this case, however, only one spacing plate or disk 20 is shown. This disk is meant to be used in the same way as the disk 1 in FIGS. 1 to 4. FIGS. 5A and 5B show the respective ends of one side of the spacing disk, while FIGS. 6A and 6B show the opposite side of the disk. The length of the disk depends on the degree of dialysis desired and on the number of disks connected in parallel. The blood is supplied through an aperture 21 and is discharged through an aperture 22. In these apertures blood distribution buttons of the same kind as the button 2 shown in FIG. 2 are mounted. The salt solution is introduced through the aperture 23 to one side of the plate which is shown in FIG. 5B and is discharged through the aperture 25 (FIG. 5A). To the opposite side of the plate the salt solution is supplied through the aperture 24 (FIG. 5B) and is discharged through the aperture 26 (FIG. 5A). From the aperture 23 the salt solution is led in a network of channels 27 to two parallel transverse channels 28. Or its way through these transverse channels the salt solution passes four restrictions 29 shown on a larger scale in FIG. 7. These restrictions 29 consist of a deep portion and a shallow portion. By varying the depth of the shallow portion it is possible to calibrate the plate carefully for suitable restriction. The restriction makes it possible to obtain an even distribution of the salt solution over the whole width of the disk. From the channels 28 the salt solution flows between longitudinal ribs 20*a* forming a grating. As shown by FIGS. 8, 10 and 11B there are also provided certain wider shallow grooves 30 in the surface of the plate. These grooves 30 will partly bridge the grooves 27 and 28 for the salt solution. Due to the fact that the diaphragm sinks down into the wider grooves 30, blood channels are formed from the aperture 21 up to the ribs 20*a*. Between the ribs 20*a* there are formed blood channels in the same way as shown in FIG. 4. The blood will consequently flow on that side of the plate which is shown in FIGS. 5A and 5B in its longitudinal direction against the current of the salt solution. Also on the opposite side of the plate, i.e. the side shown in FIGS. 6A and 6B, there are salt distribution channels. These are here designated 31 and are providing along the longitudinal sides of the plate. Furthermore, there are portions 30 countersunk in the same way as described above, which form blood distribution channels starting from the apertures 21 and 22. Also that side of the plate is provided with long parallel ribs. These ribs are here designated 20*b* and, contrary to what is the case with the ribs 20*a*, they are provided in the transverse direction of the plate. Between the ribs 20*a* and 20*b* the plate, as is best shown in FIG. 9, is provided with a web 20*c*. On this side of the plate the blood will largely flow in the longitudinal direction of the plate, while the salt solution flows in the transverse direction of the plate. The distribution of the salt solution is facilitated due to the fact that the plate is provided in its longitudinal direction with two parallel grooves 32 along each longitudinal margin of the plate. Before the salt solution flows out into the grooves 32 from the grooves 31 it has to pass a limited number of restrictions 33. The total cross-sectional area of these restrictions is chosen so as to be less than the smallest cross-section of the salt solution before these cross-sections. These restrictions are suitably formed in the same way as the restrictions 29. In order that the salt solution may spread over as large a surface as possible on the plate 20 there are additional salt distribution grooves 34 in the areas of the countersunk portions 30. Around the periphery of the side of the plate which is shown in FIGS. 5A and 5B there is finally a groove 35. This groove is meant to receive a sealing ring of the same kind as the sealing ring 8, which is shown in FIG. 2

Figure 12A:
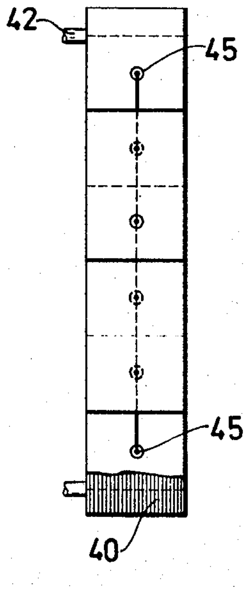
Figure 12B:
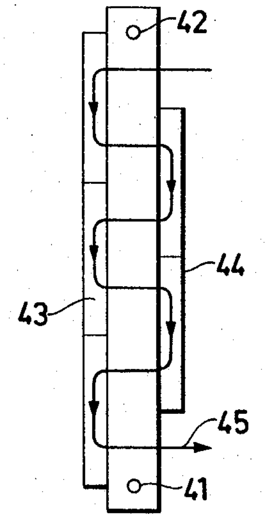

In FIGS. 12A to 14B there is shown diagrammatically how the salt flow may be controlled when using a superposed plurality of disks and membranes of the kind described above in connection with FIGS. 1 to 4. In FIG. 12A the arrangement is shown as seen from the side. The short parallel lines 40 at the bottom of the figure represents various disks. The blood is supplied via an inlet 41 and is discharged via an outlet 42. The disks are lowered together with partitions 43 and 44 into a tightly sealed jacket (not shown in details) having a salt solution inlet at one end and a salt solution outlet at the other. As a result hereof, the salt solution is given zig-zag flow outlined by the arrow 45, essentially against the flow of the blood.

Figure 13A:
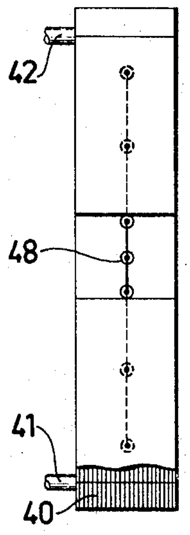
Figure 13B:
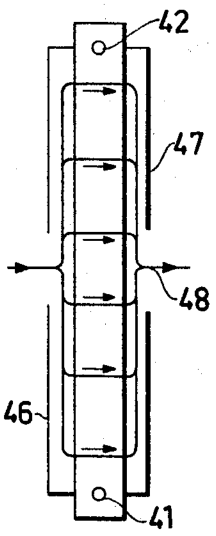

The construction according to FIGS. 13A and 13B differs from the construction described above merely through the embodiment of the partitions 46 and 47. The other details have therefore been given the same reference numerals as in FIGS. 12A and 12B. The flow obtained thereby for the salt solution is indicated by the arrow 48. In this embodiment a pure transverse flow is consequently obtained.

Figure 14A:
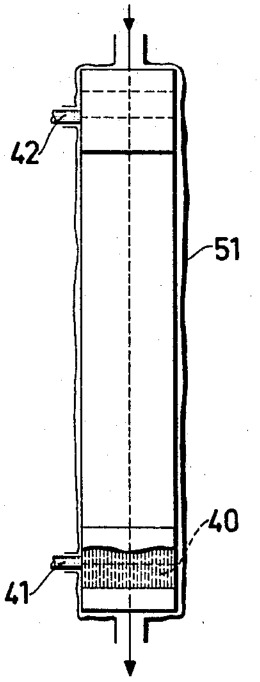
Figure 14B:
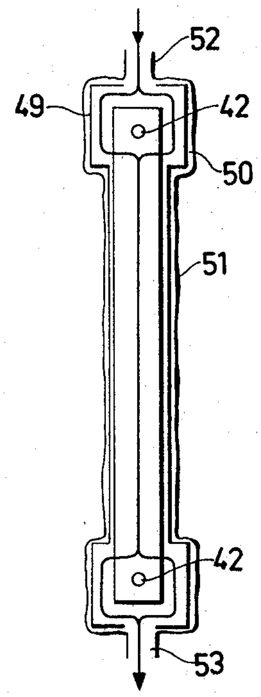

The construction according to FIGS. 14A and 14B finally differs from the construction described above due to the embodiment of the partitions 49 and 50. These figures also show a jacket 51 enclosing the arrangement and having inlet 52 and outlet 53, respectively, for the salt solution. In this construction a pure countercurrent is essentially obtained.

The pattern of the networks and/or gratings may be varied greatly according to need. It is only essential that the diaphragms or membranes are not given such large unsupported surfaces that there will be a risk of fracturing or rupturing these. As mentioned, the idea is above all to use these means as so-called artificial kidneys but the means may, of course, also be used in other cases where dialysis is desired. If it is desired to enlarge the blood channels crossing the dialysis surfaces proper it is also possible to countersink certain ribs or ridges. Thus, it is possible to countersink every other rib 20*a* and 20*b* one or two-tenths of a millimeter at the spacing disk shown in FIGS. 5A to 11B. It is also evident that the means according to the invention may be used for both countercurrent, downcurrent and crosscurrent dialysis as well as for combinations thereof.

We claim:

1. A dialysis device for purifying blood in which impurities are removed therefrom by diffusion through semi-permeable membranes into a purifying liquid comprising at least one pair of spacing discs, a pair of membranes of semi-permeable material between each of said at least one pair of spacing discs, each of said discs being provided with gratings facing the pair of membranes, said gratings forming channels therebetween, the gratings on one of said spacing discs having, in one direction, one geometric pattern and the gratings on the opposed disc of said pair of spacing discs having in said one direction a different geometric pattern, the patterns of the gratings on the opposed faces of the spacing discs forming with the membranes therebetween sealed areas at spaced locations along the gratings and continuous tortuous channels between said sealed areas on the outside of said pair of membranes for passage of the purifying liquid and between said pair of membranes for passage of the blood, means for introducing blood between said membranes to flow therebetween along the tortuous channels therebetween in one general direction and means for introducing a purifying liquid between said at least one pair of spacing discs on the outside of said membranes to flow through the tortuous channels formed by the gratings on the outside of said membranes in a general direction at an angle to the flow of blood whereby impurities in the blood are diffused through said semi-permeable membranes into the purifying liquid, means for withdrawing purified blood from the device and means for withdrawing purifying liquid containing the impurities from the device.

2. A device as claimed in claim 1 wherein one of the gratings comprises substantially parallel spaced longitudinal ribs and the other of the opposed gratings comprises parallelly spaced sinuous ribs the outer width of which is at least substantially the same as the outer width of said first mentioned ribs.

3. A device as claimed in claim 1 wherein the gratings comprise a plurality of ribs some of which are of lesser height than the remaining ribs so as to provide larger channels for the passage of blood between the pair of membranes.

4. As in claim 3 wherein alternate ribs are of lesser height than the remaining ribs.

5. A device as claimed in claim 1 and further comprising a plurality of pairs of membranes and a plurality of spacing discs each spacing disc being provided with gratings on both sides thereof, one grating having in one direction one geometric pattern and the other grating having in said one direction a different geometric pattern whereby a superposed alternating arrangement of pairs of membranes ad spacing discs will form the sealed areas at spaced locations and the continuous tortuous channels therebetween for the blood and the purifying liquid.

6. A device as claimed in claim 5 wherein each spacing disc is provided with gratings on both sides thereof, one of said gratings comprising substantially parallel spaced longitudinal ribs and the other of said gratings comprising parallelly spaced sinuous ribs, the outer width of which is at least substantially the same as the outer width of said first mentioned ribs.

7. A device as claimed in claim 5 wherein each of the plurality of spacing discs is disposed with the same geometric pattern on the upper surfaces thereof and with the different geometric pattern on the lower surfaces thereof.

8. A device as claimed in claim 5 wherein each spacing disc is provided with a web intermediate the two gratings of said disc to provide separate sets of channels formed by the two gratings of each spacing disc.

9. A device as claimed in claim 5 wherein each spacing disc is provided with a plurality of openings therethrough affording communication between the separate channels formed by the two gratings of each spacing disc.

10. A device as claimed in claim 9 wherein the tortuous channel for the passage of the purifying liquid is tortuous in a plane vertical to the plane of the pair of membranes and spacing discs whereby the purifying liquid subjects the membranes to a turbulent flushing action.

11. A device as claimed in claim 9 wherein the means for introducing and the means for withdrawing the purifying liquid are arranged with respect to the gratings of said spacing discs to cause flow of the purifying liquid transversely of the gratings whereby the purifying liquid is continuously deflected thereby to produce turbulent flow.

References Cited

UNITED STATES PATENTS

| | | | |
|---|---|---|---|
| 3,362,540 | 1/1968 | Bluemle | 210—321 |
| 3,411,630 | 11/1968 | Alwall et al. | 210—321 |

OTHER REFERENCES

Esmond, "Dialung," from Trans. Amer. Soc. Artif. Int. Organs, received in Patent Office, June 25, 1954, pp. 123–126 relied on.

Hoeltzenbein, "Discussion," from Trans. Amer. Soc. Artif. Int. Organs, vol. XII, received in Patent Office, July 6, 1966, pp. 368 and 369 relied on.

REUBEN FRIEDMAN, Primary Examiner

F. A. SPEAR, Jr., Assistant Examiner